United States Patent Office 3,759,808
Patented Sept. 18, 1973

3,759,808
UNSATURATED DIACRYLATES POLYMERIZED WITH ULTRAVIOLET LIGHT
Earl E. Parker, Allison Park, and Marco Wismer, Gibsonia, Pa., assignors to PPG Industries, Inc., Pittsburgh, Pa.
No Drawing. Filed Apr. 20, 1971, Ser. No. 135,793
Int. Cl. C08f 1/18, 1/20
U.S. Cl. 204—159.23                                    9 Claims

ABSTRACT OF THE DISCLOSURE

A novel method of preparing a strong non-glossy material comprises subjecting a composition comprising an ethylenically unsaturated diacrylate and a peroxide catalyst to actinic light to cure. The materials are useful as films and coatings.

A method of forming films and coatings having good strength, mar resistance and stain resistance is that of subjecting ethylenically unsaturated diacrylates to actinic light to cure. This method of irradiating with actinic light to cure the monomer is advantageous as the rate of crosslinking achieved thereby is unobtainable by most other methods.

The prior art method of heat curing the diacrylates catalyzed with a peroxide has produced glossy films. The actinic light treatment of the diacrylates conventionally has failed to produce a reasonable cure. It has also been found that the actinic light treatment of diacrylates results in glossy films. This is desirable in some cases, but in many cases it is necessary to achieve a coating which is flat or has a low gloss. Thus at the present time a satisfactory method of producing a non-glossy diacrylate film has been heretofore commercially infeasible.

It has now been discovered that a film or coating may be achieved with low gloss by treating a composition comprising an ethylenically unsaturated diacrylate and a peroxide catalyst with actinic light to cure.

The ethylenically unsaturated diacrylates used herein generally have the formula:

(A)   $CH_2=\overset{R''}{\underset{|}{C}}-COOR'O[OCRCOOR'O]_nOC-\overset{R''}{\underset{|}{C}}=CH_2$, or (B)
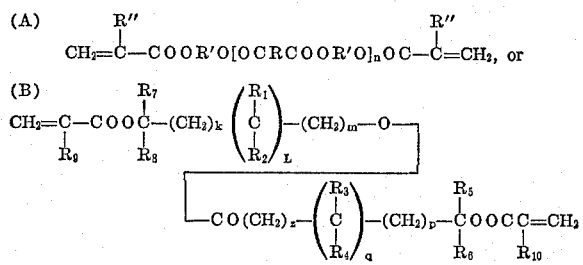

wherein R'' is either H or $CH_3$, R' is a divalent saturated or unsaturated aliphatic hydrocarbon radical having from about 2 to 10 carbon atoms such as ethylene, trimethylene, tetramethylene, butylene, ethylbutylene, hexamethylene, octamethylene, cyclohexylene, propylene, trimethylene, decamethylene and the like. R represents a connecting linkage between the two adjacent carboxylic radicals selected from the class consisting of a single valence bond and a divalent saturated or unsaturated hydrocarbon radical having up to about 10 carbon atoms. Examples of these linkages are aromatic radicals such as ortha, meta or para phenylene, tetra chloro phenylene and the like and nonaromatic radicals such as ethylene, tetramethylene, octamethylene, cyclohexylene, tetraethylene, octamethylene and the like.

$R_1$, $R_2$, $R_3$ and $R_4$ are selected from the group consisting essentially of H, alkyl, aryl, and cycloalkyl, substituted alkyl, substituted aryl and substituted cycloalkyl groups. The alky groups may be of any length but the preferred alkyl radicals contain from 1 to 8 carbon atoms such as methyl, ethyl, isopropyl, hexyl, octyl, and the like. The preferred cycloalkyl groups contain from 5 to 8 carbon atoms such as cyclopentyl, cyclohexyl, cycloheptyl and cyclooctyl. The preferred aryl groups contain up to 8 carbon atoms such as phenyl, benzyl, and the like. The alkyl, cycloalkyl and aryl radicals may also be substituted with halogens, hydroxyl, etc. Examples of these radicals are chloropropyl, bromobenzyl, chlorocyclopentyl, hydroxyethyl, chlorooctyl, chlorophenyl, bromophenyl, hydroxyphenyl, and the like.

The radicals $R_5$, $R_6$, $R_7$ and $R_8$ are selected from the group consisting of H, alkyl, aryl, and cycloalkyl. Examples of the alkyl, cycloalkyl, and aryl radicals which may apply are given above under the discussion of $R_1$, $R_2$, $R_3$ and $R_4$.

The radicals $R_9$ and $R_{10}$ are selected from the group consisting of H, alkyl groups containing from 1 to 2 carbon atoms, halo-substituted alkyl groups containing from 1 to 2 carbon atoms, and halogen. Examples are methy, ethyl, bromoethyl, and chlorine.

Although $R_1$, $R_2$, $R_3$, $R_4$, $R_5$, $R_6$, $R_7$, $R_8$, $R_9$, and $R_{10}$ may be the same radicals, each one of them may be different from the other as long as they fall under the general definition for each. That is to say, that while $R_1$ and $R_2$ may be H, $R_3$ may be ethyl, $R_4$ may be pentyl, $R_5$ and $R_6$ may be cyclohexyl, etc.

Subscripts $k$, $L$, $m$, $z$, $q$ and $p$ are whole numbers having values from 0 to5.

The most preferred of the diacrylates having the Formula A is a mixture of materials having the formula:

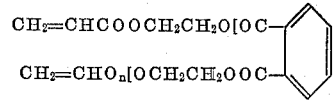

or

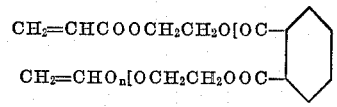

The preferred compounds having the Formula B are those that contain the neopentyl type structures, for example, those wherein $R_1$, $R_2$, $R_3$, and $R_4$ are lower alkyl groups, such as methyl, ethyl and propyl, and $R_5$, $R_6$, $R_7$ and $R_8$ are H, and $p$ and $k$ are 0, 1 and $q$ are 1, and $m$ and $z$ have values of 1 or 2. It has been found that these compounds exhibit the most durable and weather-resistant properties.

The most preferably compound having this structure is acryloxypivalyl acryloxypivalate, in which $R_1$, $R_2$, $R_3$, $R_4$ ar $CH_3$ radicals and $R_5$, $R_6$, $R_7$, $R_8$, $R_9$, and $R_{10}$ are H and $m$, $L$ and $q$ are 1 and $k$, $z$ and $p$ are 0.

Examples of other compounds having the above structures are methacryloxypivalyl methacryloxypivalate where $R_1$, $R_2$, $R_3$, $R_4$, $R_9$ and $R_{10}$ are $CH_3$ radicals and $R_5$, $R_6$, $R_7$, and $R_8$ are H and L, $m$ and $q$ are 1 and $k$, $z$ and $p$ are 0, 4-acryloxybutyl 4-acryloxybutyrate where $R_1$ to $R_{10}$ are H and L and $q$ are 1, $k$ and $p$ are 2 and $m$ and $z$ are 0, acryloxypivalyl 4-acryloxybutyrate where $R_5$ to $R_{10}$ are H, $R_1$ and $R_2$ are $CH_3$. $k$ and $q$ are 0, L, $m$ and $p$ are 1 and $z$ is 2, 2-acryloxyethyl acryloxypivalate where $R_5$ to $R_{10}$ are H and $R_3$ and $R_4$ are $CH_3$. $k$ and $q$ are 1 and L, $m$, $z$, and $p$ are 0.

It is noted that mixtures of any two or more of the above compounds are also intended to be included by the above formula.

The novel compounds described above may be formed by reacting a compound selected from the group consisting of acrylic acid, methacrylic acid, acrylic anhydride, methacrylic anhydride, and acid halides of acrylic and methacrylic acid or mixtures of any of these acidic acrylic compounds with a diol having the general formula:

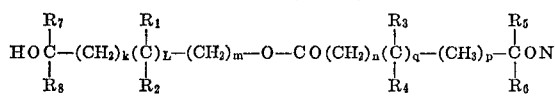

wherein $R_1$ to $R_8$, $k$, $L$, $m$, $n$, $q$ and $p$ are as described above. The preferred reactants are acrylic and methacrylic acids as the acidic components and hydroxypivalyl hydroxypivalate as the diol.

The reaction is generally carried out at temperatures from about 50° C. to about 150° C. and preferably from about 95° C. to about 100° C. The molar ratio of acidic compound to diol is about 2:1 to about 10:1. It is preferred, however, to use from about 2 to about 2.5 mols of acidic component for every mol of diol.

The reaction is run in the presence of an acid catalyst such as sulfuric acid, p-toluenesulfonic acid, phosphoric acid, hydrochloric acid, and the like. The catalyst usually comprises from about 0.1 percent to about 5 percent by weight of the reactants.

In most cases a free-radical inhibitor is also used to prevent the reactants from gelling. Any free-radical inhibitor may be used such as hydroquinone, methylquinone, p-methoxyphenol, and the like. The inhibitor comprises from about 0.1 percent to about 5 percent by weight of the reactants.

The reaction is carried out by adding the diol, a portion of the acidic component, the catalyst, and the inhibitor and heating. It is highly desirable that the acidic component be added to the composition incrementally. Up to about 50 perecnt of the total amount of acidic component may be added with the diol but the remainder of the acidic component should be added over a period of time. It has been found that when 50 percent of the acidic component is added with the diol, the remainder of the component may be added dropwise over a period of ¼ hour to about 6 hours.

It is noted that the compounds and mixtures of this invention may be mixed with other monomers and polymers. Examples of polymers which may be utilized along with the novel mixtures of this invention are acrylic polymers, vinyl polymers, and polyesters. Examples of other monomers which may be used along with the mixtures are acrylic monomers such as alkyl acrylates and methacrylates such as ethyl acrylate, butyl acrylate, 2-ethylhexylacrylate and methacrylate, lauryl acrylate and methacrylate and hydroxy alkyl acrylates and methacrylates such as hydroxyethyl acrylates and hydroxy methylmethacrylate and the like. Other materials may also be used to enhance the physical properties of the coating composition such as conventional pigments, plasticizers, etc.

The peroxide catalyst for the diacrylates are organic peroxides and organic hydroperoxides or esters thereof. Typical organic peroxides useful as catalysts for the diacrylates include benzoyl peroxide, acetyl peroxide, lauryl peroxide, methylethyl ketone peroxide, cyclohexanone peroxide and the like.

Organic hydro peroxides or their esters with carboxylic acids may also be useful as catalysts for the diacrylates. Many other useful catalysts are disclosed in the monograph "Organic Peroxides" by A. V. Tovolsky and R. B. Mesrobian, copyrighted in 1954 by Interscience Publishers, Inc., New York, pp. 158–163. One example of a useful catalyst other than those listed above is azobis isobutyronitrile. These catalysts may be utilized in amounts of about 0.1 percent to about 5 percent by weight based upon the total composition.

The compositions may also contain accelerators such as tertiary amine compounds to accelerate the cure.

The coating compositions may contain photosensitizers to aid in the actinic light curing of the compositions. Various common photosensitizers are benzoin, benzoin methyl ether, diphenyl disulfide, dibenzyl disulfide, benzil and the like. Generally the coating may comprise from about 0.1 percent by weight of the photosensitizer to about 5 percent by weight of the photosensitizer.

The composition, to get a more pronounced wrinkling effect thus reducing the gloss, should also contain highly ultraviolet absorbent pigments such as titanium dioxide, benzidine yellow, para red, phthalocyanine blue and phthalocyanine green, and the like to produce an opaque coating. Other pigments which are not highly ultraviolet absorbing may be used also, such as lithopone (barium sulfate, zinc sulfide, and zinc oxide) antimony oxide and the like. It is noted that although the pigments may be opaque to actinic light, the composition cures and has a flat finish. The best results are obtained using at least about 5 percent by weight of the flattening pigments.

The composition comprising the diacrylate and peroxide catalyst is cured into a non-glossy film by subjecting to actinic light. In general, the use of wave lengths in which sensitivity to actinic light occurs is approximately 1800 to 4000 angstrom units. Various suitable sources of the actinic light are available in the art including by way of example, quartz mercury lamps, ultraviolet cored carbon arcs, and high-flash lamps.

The length of exposure to the actinic light and the intensity of the source may be varied greatly. The treatment is continued until the composition is cured to a hard non-glossy state.

The novel method of this invention may be used to coat substrates with non-glossy diacrylates by merely applying the composition to the substrate and subjecting the composition to actinic light to cure in situ.

Any conventional means of applying the composition to the substrate may be used such as dip coating, roll coating, spraying and the like.

The coated substrates are quite useful for plywood paneling, cabinets, furniture, printed paper products, cement, and cement asbestos products, and the like.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A composition comprising 60 parts of acryloxypivalyl, acryloxypivalate, 40 parts of titanium dioxide, 0.6 part of benzoyl peroxide, and 0.6 part of benzoin methyl ether was drawn down on an aluminum panel to a one mil thickness and cured by passing twice under an ultraviolet lamp at 15 feet per minute.

The resulting coating was tested for gloss using the 85° glossmeter test. The 85° glossmeter test comprises reflecting a light off the coating or film at an 85° angle and the percent reflectance is measured. The glossmeter test is a standard ASTM-D-523-67 test for evaluating gloss.

The coating had a gloss reflectance of only 11 and a pencil hardness of F.

EXAMPLE 2

A composition comprising 40 parts of titanium dioxide, 0.6 part of benzoyl peroxide, 0.6 part of benzoin methyl ether, and a mixture of compounds having the formula:

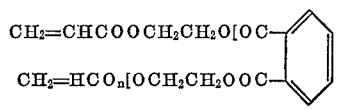

wherein $n$ is from 0 to 10 and the mixture comprises from about 1 to about 20 percent by weight of the compound where $n=1$, from about 5 to about 12 percent of the compound where $n=0$, from about 15 to about 25 percent of the compound where $n=2$, from about 15 to about 25 percent of the compound where $n=3$ and from about 40 to about 55 percent of the compound where $n=4$ to 10 with trace amounts of compounds present where $n$ is greater than 10 was drawn down on an aluminum panel to a one mil thickness and cured by passing twice under an ultraviolet lamp at 15 feet per minute.

The resulting coating had a gloss reflectance of only 2 using the 85° glossmeter test indicating the coating was almost completely flat and a pencil hardness of H.

EXAMPLE 3

A composition comprising 40 parts of titanium dioxide, 0.6 part of benzoyl peroxide, 0.6 part of benzoin methyl ether, and a mixture of compounds having the formula:

$$CH_2=CHCOOCH_2CH_2O[OC-\bigcirc$$
$$CH_2=HCO_n[OCH_2CH_2OOC-\bigcirc$$

wherein $n$ is from 0 to 10 and the mixture comprised from about 1 to about 20 percent by weight of the compound where $n=1$ from about 5 to about 12 percent of the compound where $n=0$, from about 15 to about 25 percent of the compound where $n=2$, from about 15 to about 25 percent of the compound where $n=3$, and from about 40 to about 55 percent of the compound where $n=4$ to 10 with trace amounts of compounds present where $n$ is greater than 10 was drawn down on an aluminum panel to a one mil thickness and cured by passing twice under an ultraviolet lamp at 15 feet per minute.

The resulting coating had a gloss reflectance of only 14 using the 85° glossmeter test and a pencil hardness of H.

Although specific examples of the instant invention have been set forth hereinabove, it is not intended that the invention be limited solely thereto, but to include all the variations and modifications following within the scope of the appended claims.

What is claimed is:

1. The method of preparing a cured, non-glossy ethylenically unsaturated diacrylate comprising subjecting a composition comprising an ethylenically unsaturated diacrylate having the formula:

(A)
$$CH_2=\overset{R''}{\underset{}{C}}-COOR'O[OCRCOOR'O]_nOC-\overset{R''}{\underset{}{C}}=CH_2, \text{ or}$$

(B)
$$CH_2=\overset{R_7}{\underset{R_9}{C}}-COO\overset{R_1}{\underset{R_8}{C}}-(CH_2)_k(\overset{}{\underset{}{C}})_L-(CH_2)_m-O-CO(CH_2)_z-$$
$$(\overset{R_3}{\underset{R_4}{C}}_q-(CH_2)_p-\overset{R_5}{\underset{}{C}}OO\overset{}{\underset{R_{10}}{C}}=CH_2$$

wherein:

R is a connecting linkage selected from the class consisting of a single valence bond, a divalent saturated hydrocarbon radical having up to about 10 carbon atoms and a divalent unsaturated hydrocarbon radical having up to about 10 carbon atoms;

R' is a divalent saturated aliphatic hydrocarbon radical having from about 2 to about 10 carbon atoms or a divalent unsaturated aliphatic hydrocarbon radical having from about 2 to about 10 carbon atoms;

R'' is H or $CH_3$;

$n$ is from 0 to 10;

$R_1$, $R_2$, $R_3$, and $R_4$ are each selected from the group consisting of H, alkyl, aryl, cycloalkyl, substituted alkyl, substituted aryl and substituted cycloalkyl;

$R_5$, $R_6$, $R_7$, and $R_8$ are each selected from the group consisting of H, alkyl, aryl, and cycloalkyl;

$R_9$ and $R_{10}$ are each selected from the group consisting of H, alkyl groups containing from 1 to 2 carbon atoms, halo-substituted alkyl groups containing from 1 to 2 carbon atoms, and halogen;

$k$, $L$, $m$, $z$, $q$, and $p$ are whole numbers having values from 0 to 5;

and from about 0.1 percent to about 5 percent by weight of a peroxide catalyst and at least about 5 percent by weight of ultraviolet absorbent pigments to actinic light having wavelengths in the range of from about 1800 to about 4000 angstrom units to cure.

2. The method of claim 1 wherein the peroxide catalyst is benzoyl peroxide.

3. The method of claim 1 wherein the pigment is titanium dioxide.

4. The method of claim 1 wherein the composition also comprises a photosensitizer.

5. The method of claim 4 wherein the photosensitizer is benzoin methyl ether.

6. The method of claim 1 wherein the diacrylate is admixed with a copolymerizable monomer, said diacrylate comprising 1 to 99 percent by weight of said copolymerizable mass.

7. The method of claim 6 wherein the diacrylate has the formula:

$$CH_2=C-COOCH_2CH_2[OOC\bigcirc$$
$$CH_2=CH-COO_n[CH_2CH_2OOC\bigcirc$$

wherein $n$ is from 0 to 10.

8. The method of claim 6 wherein the dicarylate has the formula:

$$CH_2=C-COOCH_2CH_2[OOC\bigcirc$$
$$CH_2=CH-COO_n[CH_2CH_2OOC\bigcirc$$

wherein $n$ is from 0 to 10.

9. The method of claim 6 wherein the diacrylate is acryloxypivalyl acryloxypivalate.

References Cited

UNITED STATES PATENTS

| | | | |
|---|---|---|---|
| 3,455,801 | 7/1969 | D'Alelio | 204—159.19 |
| 3,582,487 | 6/1971 | Krefeld | 204—159.15 |
| 2,949,361 | 8/1960 | Agens | 204—159.23 |
| 3,326,710 | 6/1967 | Brodie | 204—159.19 |
| 3,485,732 | 12/1969 | D'Alelio | 204—159.19 |
| 3,485,733 | 12/1969 | D'Alelio | 204—159.19 |
| 3,455,802 | 7/1969 | D'Alelio | 204—159.19 |
| 3,511,687 | 5/1970 | Keyl | 204—159.19 |

PAUL LIEBERMAN, Primary Examiner

U.S. Cl. X.R.

204—159.22; 260—89.5 R, 89.5 H, 89.5 A